US006493759B1

(12) United States Patent
Passman et al.

(10) Patent No.: US 6,493,759 B1
(45) Date of Patent: Dec. 10, 2002

(54) CLUSTER HEAD RESIGNATION TO IMPROVE ROUTING IN MOBILE COMMUNICATION SYSTEMS

(76) Inventors: William S. Passman, 198 East St., Lexington, MA (US) 02420; Joseph J. Weinstein, 94 Beacon St., Apt. 31, Somerville, MA (US) 02143; John R. Zavgren, 15 Deacon Hunt Rd., Acton, MA (US) 01720; Brig Barnum Elliott, 25 Wollaston Ave., Arlington, MA (US) 02476; Keith W. Manning, 16 Lake St., Arlington, MA (US) 02474

( * ) Notice: Subject to any disclaimer, the term of this patent is extended or adjusted under 35 U.S.C. 154(b) by 32 days.

(21) Appl. No.: 09/624,635

(22) Filed: Jul. 24, 2000

(51) Int. Cl.⁷ .............................................. G06F 15/16
(52) U.S. Cl. ........................ 709/227; 455/7; 455/450; 455/446; 455/447; 455/448; 709/201; 709/212; 709/213
(58) Field of Search ................................ 709/212–213, 709/216, 241, 227, 201; 455/446–450

(56) References Cited

U.S. PATENT DOCUMENTS

| | | | |
|---|---|---|---|
| 4,152,647 A | 5/1979 | Gladden et al. ................ 325/4 |
| 4,718,002 A | 1/1988 | Carr ............................ 364/200 |
| 5,093,824 A | 3/1992 | Coan et al. .................... 370/16 |
| 5,243,592 A | 9/1993 | Perlman et al. ................ 370/17 |
| 5,850,592 A | 12/1998 | Ramanathan ................... 455/7 |
| 5,881,246 A | 3/1999 | Crawley et al. ........ 395/200.68 |
| 5,913,921 A | 6/1999 | Tosey et al. ................. 709/220 |

OTHER PUBLICATIONS

"Link–State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Networks," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41–47.

"The Organization of Computer Resources into a Packet Radio Network," R.E. Kahn, IEEE Trans. On Communications, vol. COM–25, No. 1, Jan. 1977, pp. 169–178.

"Analysis of Routing Strategies for Packet Radio Networks," J.J. Garcia Lune Aceves et al., Proc. Of the IEEE INFOCOM '85, Washington, DC, Mar. 1985, 292–302.

"The DARPA Packet Radio Network Protocols," J. Jubin et al., Proc. Of the IEEE, vol. 75, No. 1, Jan. 1987, pp. 21–32.

*Primary Examiner*—Dung C. Dinh
*Assistant Examiner*—Hieu Le
(74) *Attorney, Agent, or Firm*—Leonard Charles Suchyta; James K. Weixel

(57) ABSTRACT

A communications system for communication among plural stations in a network has stations (CH1, CM2, CM3, CH4, CH5, CM6, CM7) arranged in clusters (1a, 1b, 1c) of communication member stations, each communicating with each other. One of the member stations (CH1, CH4, CH5) is a head station of the cluster. The cluster head stations (CH1, CH4, CH5) communicate with other cluster head stations (CH1, CH4, CH5). A method for configuring the network of stations includes a step of operating at least a first (CH5) and a second (CH4) station of the plural stations as cluster head stations, the first (CH5) and second (CH4) stations forming a communications link. The method also includes a step to resign the first (CH5) station from operating as a cluster head station when a predetermined resignation condition is met. The method also includes a step of maintaining the communication link between the first (CH5) and second (CH4) station as the first station (CH5) transitions from operating as a cluster head station (CH5) to operating as a cluster member station (CM5) of a cluster headed by the second cluster head station (CH4).

7 Claims, 10 Drawing Sheets

CLUSTER HEAD RESIGNATION TO IMPROVE ROUTING IN MOBILE COMMUNICATION SYSTEMS

BACKGROUND OF THE INVENTION

1. Field of the Invention

The present invention relates generally to an apparatus, program and method for network communications. More particularly, the present invention relates to a cluster head resignation procedure that minimizes data loss in a communications network having member stations arranged in clusters, with each cluster having a head station.

2. Related Art

Communications networks can be formed by arranging a plurality of mobile communications stations into a hierarchical configuration including groups (e.g., "clusters"), with each group having a group or cluster head (e.g., "cluster gateway"). A cluster head represents affiliated cluster members to the network. Cluster head stations communicate with each other to form a network backbone, and cluster member stations relay messages to the network through affiliated cluster heads. In mobile systems, cluster members move into and out of clusters depending on their physical location and radio connectivity. Depending on mobility changes of stations in a mobile network, new clusters form and cluster heads emerge as stations move around.

Wireless communications in a mobile environment has a unique problem in that network topology is constantly changing. As will be appreciated, grouping member stations into clusters addresses this problem since communication nodes outside of a cluster do not need to know about changes of topology within a cluster. Thus, a large amount of changing topology information does not need to be flooded through the network.

An example of a mobile communications network is shown in FIG. 2a. Areas 1a, 1b and 1c represent individual clusters in FIG. 2a. In FIG. 2a, as in the other relevant figures, a double-circle indicates a Cluster Head ("CH"), whereas a single circle indicates a Cluster Member ("CM"). In the FIG. 2a example, CM2 and CM3 are affiliated with a cluster headed by CH1, and CM6 and CM7 are affiliated with a cluster headed by CH5.

Another example of a mobile communications network is disclosed in U.S. Pat. No. 5,850,592, issued to S. Ramanathan on Dec. 15, 1998, and assigned to the same assignee. The U.S. Pat. No. 5,850,592 discloses a method for a plurality of mobile stations to automatically organize themselves into a hierarchical network, in which some of the stations operate as message gateways (e.g., cluster heads) for a cluster of mobile stations. Initially, mobile stations search for available cluster heads and initiate an affiliation procedure to establish themselves as cluster members. If the affiliation procedure is successful, a mobile station operates as a cluster member. A mobile station monitors its communication link with a cluster head and seeks to reestablish a link when it is compromised or severed. During this reaffiliation, a mobile station may affiliate with a different cluster head if such cluster head is within range. Otherwise, a mobile station promotes itself to operate as a cluster head.

In the arrangement of the U.S. Pat. No. 5,850,592, a plurality of mobile stations is employed, with each station operating in at least two basic modes. In the first mode, the mobile station serves as a message gateway (e.g., a "cluster head" or "network access point") for a cluster of other member stations (e.g., "non-gateway" stations). The second mode allows the mobile station to operate as a non-gateway (or "cluster member") station. Each mobile station determines which out of the two modes to operate in, as discussed above.

The mobile stations disclosed in the U.S. Pat. No. 5,850,592 patent can operate at two different power levels. When there are no other available cluster heads, the mobile station operates as a cluster head, and transmits at a relatively high power level. The cluster head transmits at the relatively high power level to communicate with other cluster head stations and to typically provide longer distance network links. Although the cluster head communicates at a higher power level with other cluster heads, the cluster head can still communicate with its cluster members using a relatively lower power level. A cluster head can also periodically broadcast a signal to establish the station's presence and its availability to operate as a cluster head.

The cluster head stations disclosed in the U.S. Pat. No. 5,850,592 periodically test their proximity conditions to other cluster head stations, e.g., by signal strength measurements or using data available through the cluster head stations exchanging messages. If the tests indicate that the proximity conditions are exceeded, e.g., that the particular station's operation as a gateway is possibly redundant and/or unnecessary, the station executes a resignation procedure. Before terminating operation as a cluster head, the cluster head broadcasts a termination request and waits for a predetermined time to see if all affiliated cluster members accept the request. Each linked or neighboring cluster head station also receives a resignation request from the resigning cluster head. The receiving cluster head neighbor checks to see if the resigning station is an articulation point. For example, as shown in FIG. 2b, CH5 is an articulation point since it is the only cluster head linking CH1 and CH4. If, on the other hand, as shown in FIG. 2a, CH1 and CH4 are linked independently of CH5, CH5 is not an articulation point for CH1 or CH4. If the resigning cluster head is an articulation point, the receiving cluster head neighbor does not send a confirmation message, essentially blocking the resignation of the cluster head.

This process may not be entirely satisfactory in all settings because the process requires communication between the resigning node and its neighbors as part of the process of attempting to resign. In many cases such communication is not necessary because the resigning cluster head may make this determination itself (e.g., that it is an n-connectivity point) and block its own resignation for that reason. In general, an n-connectivity point is a member of at least one set of 'n' nodes which—if that set were deleted from the network—would cause the network to fall into two or more distinct, unconnected portions (e.g., partitions). Thus an "articulation point" is a 1-connectivity point. If a node is a 2-connectivity point, then removal of that node and some other node would partition the network, and so forth. As will be appreciated, it is desirable to have networks remain connected. Hence, in general, it is also desirable to have at least 'n' nodes to connect the various portions of the network, where n>1 for redundancy.

Returning to the resignation procedure discussed in the U.S. Pat. No. 5,850,592, if a resignation is successful, and after a random amount of time has expired, the resigning mobile station must reestablish itself as a cluster member. This resignation process is a "break-before-make" approach; that is, the resigning cluster head actually loses network connectivity (as a cluster head) before it attempts to regain network connectivity (as a cluster member). This type of approach is not always satisfactory as it is usually highly desirable or even essential for every node in a network to have network connectivity at all times.

Other implementations of clustering methods do not even employ resignation procedures. In these cases, a network eventually has so many cluster heads that routing overhead overwhelms the limited available bandwidth. This routing overhead may produce a communication scheme that functions as if there was no attempt to use clusters to reduce network topology traffic.

These types of problems are not adequately addressed in the art. Thus, there is a need for a flexible communications station in a communications network to reduce routing overhead by determining when and how a cluster and a cluster head are no longer needed in the network. There is also a need for a communications node that will not resign if it is a critical node. There is another need to provide an adaptive, wireless mobile communications station with the ability to minimize data loss as a communication node transitions from operating as a cluster head to operating as a cluster member.

SUMMARY OF THE INVENTION

The present invention relates generally to a cluster head resignation procedure to improve routing in mobile networking systems. The improved routing procedure prevents data loss while a cluster head resigns A resigning cluster head maintains a communication link (or maintains an ongoing affiliation) with a neighboring cluster head as the resigning cluster head transitions from operating as a cluster head to operating as a cluster member.

According to the invention, a mobile communications station is provided which communicates among a plurality of mobile stations in a network. Stations within the network are arranged in clusters of communication member stations, with one member station in each cluster being a head station for the cluster. Each member station communicates with the network through one or more cluster head stations. The cluster head stations communicate with other cluster head stations. The mobile station includes a transceiver that transmits signals to and receives signals from mobile stations in the network.

According to one aspect of the invention, the mobile communications station includes a memory and a processor. The memory has network information stored thereon. The processor (i) operates the mobile station as a cluster head station; (ii) resigns the mobile station from operating as a cluster head station; and (iii) maintains affiliation with a cluster head neighbor at least during a period in which the mobile station resigns from operating as a cluster head and commences operating as a cluster member of the cluster head neighbor.

According to another aspect, a mobile communications station includes a processor that controls a transceiver to transmit a signal representing an intention of the mobile station to resign as a cluster head station. The processor determines whether the mobile station is a network n-connectivity point, and prevents the mobile station from resigning as a cluster head station when the mobile station is an n-connectivity point. A determination is based on analyzing network topology information.

According to yet another aspect, a mobile communications station includes a processor that prevents the mobile station from resigning as a cluster head station based on at least one of a resignation command setting indicating that the mobile station should not resign; a predetermined plan for the mobile station and nearby stations that indicate that the mobile station will better serve the network if it does not resign; indications that other, nearby cluster heads are already in the process of resigning; and discovery that some or all of the cluster members affiliated with the mobile station have not reaffiliated with other clusters.

According to still another aspect, network information stored in a memory includes network topology information. The network topology information includes at least one of signal strength, organizational affiliation, number and type of affiliated stations, planned station movement over time, plans for entering radio silence, disruptions of communications caused by jammers, self-interference, or natural terrain, battery power remaining, and so forth.

According to another aspect, a mobile communications station includes a processor that selects a first neighboring cluster head station to maintain affiliation with while resigning as a cluster head station. A selection is made based on at least one of signal strength, organizational affiliation, number of cluster members affiliated with the cluster head station, highest percentage of transmissions received without disruption, fastest communication link speed, least power required for transmissions, a station that is most compatible with a planned movement of the station, an indicator for radio silence in the future, and direction for pointing a directional antenna so as to avoid jammers or natural interference.

According to still another aspect, a mobile communications station includes a processor that controls a transceiver to transmit a signal to a selected first cluster head station requesting a status change from a cluster head station to a cluster member station.

According to yet another aspect, a mobile communications station includes a processor that resigns the mobile station from operating as a cluster head station when the mobile communication station receives an acknowledgement from the first selected cluster head station, while the processor maintains a communication link with the selected first cluster head station.

Still another aspect of the present invention relates to a mobile station having a processor that selects a second neighboring cluster head station to maintain affiliation with when the mobile station does not receive an acknowledgement from the first neighboring cluster head.

According to yet another aspect, a mobile communications station includes a processor that controls the transceiver to send a signal to each affiliated cluster member station signaling the intended resignation of the mobile station as a cluster head station. The processor controls the mobile station to operate as a cluster member station of a cluster headed by the cluster head neighbor once the transceiver has transmitted the signal.

According to one embodiment, a network communications apparatus is provided. The apparatus includes a memory, a processor and a transmitter. The memory stores network information. The processor (i) controls operation of the apparatus to operate as a cluster gateway; (ii) controls the apparatus to resign from operating as a cluster gateway; and (iii) maintains affiliation with a first cluster gateway at least during a period in which the apparatus ends operation as a cluster gateway and commences operation as a cluster member of the first cluster gateway. The transceiver transmits communication messages.

In another embodiment, a method of operating a communications station is provided. The communications station is in a communications system for communication among plural member stations in a network in which member stations are arranged in clusters of communication member stations. One of the member stations is a cluster head. Each member station communicates with the network through an affiliated cluster head station. The cluster head stations communicate with other cluster head stations. A method of operating a communications station includes steps of (i) operating the communications station as a cluster head station; (ii) resigning the communications station from operating as a cluster head station; and (iii) maintaining affiliation with a first neighbor cluster head station while the communications station transitions from operating as a cluster head station to operating as a member station of a cluster headed by the first neighbor cluster head station.

In another embodiment, computer executable code is stored on a computer readable medium. The code is to operate a communications station so as to communicate with a plurality of mobile stations in a network in which stations are arranged in clusters of communication member stations. One member station is a cluster head station for each cluster. Each member station communicates with the network through at least one affiliated cluster head station. The cluster head stations communicate with other cluster head stations. The computer executable code includes: (i) code to operate the communications station as a cluster head station; (ii) code to resign the communications station from operating as a cluster head station; and (iii) code to maintain affiliation with a first neighbor cluster head station at least during a period when the communication station resigns as a cluster head station and commences operation as a member station of a cluster headed by the first neighbor cluster head station.

In still another embodiment, a method that configures a network of stations is provided. The method is employed in a communications system for communication among plural stations in a network in which stations are arranged in clusters of communication member stations with one of the member stations being a head station of the cluster. The cluster head stations communicate with other cluster head stations. A method that configures the network of stations includes the steps of: (i) operating at least a first and a second station of the plural stations as cluster head stations, the first and second stations forming a communications link; (ii) resigning the first station from operating as a cluster head station when a predetermined resignation condition is met; and (iii) maintaining the communication link between the first and second station as the first station transitions from operating as a cluster head station to operating as a cluster member station of a cluster headed by the second cluster head station.

In still another embodiment, a network communications apparatus is provided. The apparatus includes storage means, first control means, second control means, maintaining means and transmitting means. The storage means stores network information. The first control means controls an operation of the apparatus in a cluster gateway mode. The second control means controls the apparatus to resign from operating in the cluster gateway mode. The maintaining means maintains a communication link with a first cluster gateway while the apparatus transitions from operating in the cluster gateway mode to operating in a cluster member mode as a cluster member of a cluster headed by the first cluster head station. The transmitting means transmits communication messages.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Some forms of ad hoc wireless networks simplify routing and minimize routing traffic by organizing nodes (e.g., network members) into groups called clusters. A cluster may include a single cluster head and zero or more cluster members.

As will be understood by those skilled in the art, various procedures exist for routing messages over a network, even when a configuration of the network may change. As will also be understood, there are procedures for measuring or rating the connectivity of a network in a particular configuration, versus alternative configurations that are well known in the art.

The preferred embodiments will be described with respect to a wireless mobile communications station and to a network formed by a plurality of similar mobile stations. However, the present invention is not limited to the wireless mobile communications field. Instead, the invention is applicable to many other types of networks and communication nodes, including cellular telephone systems, wireless metropolitan area networks, wireless local area networks, wireless personal area networks, military communications networks, specialized networks employed in extraterrestrial applications, and so forth.

Figure 1:
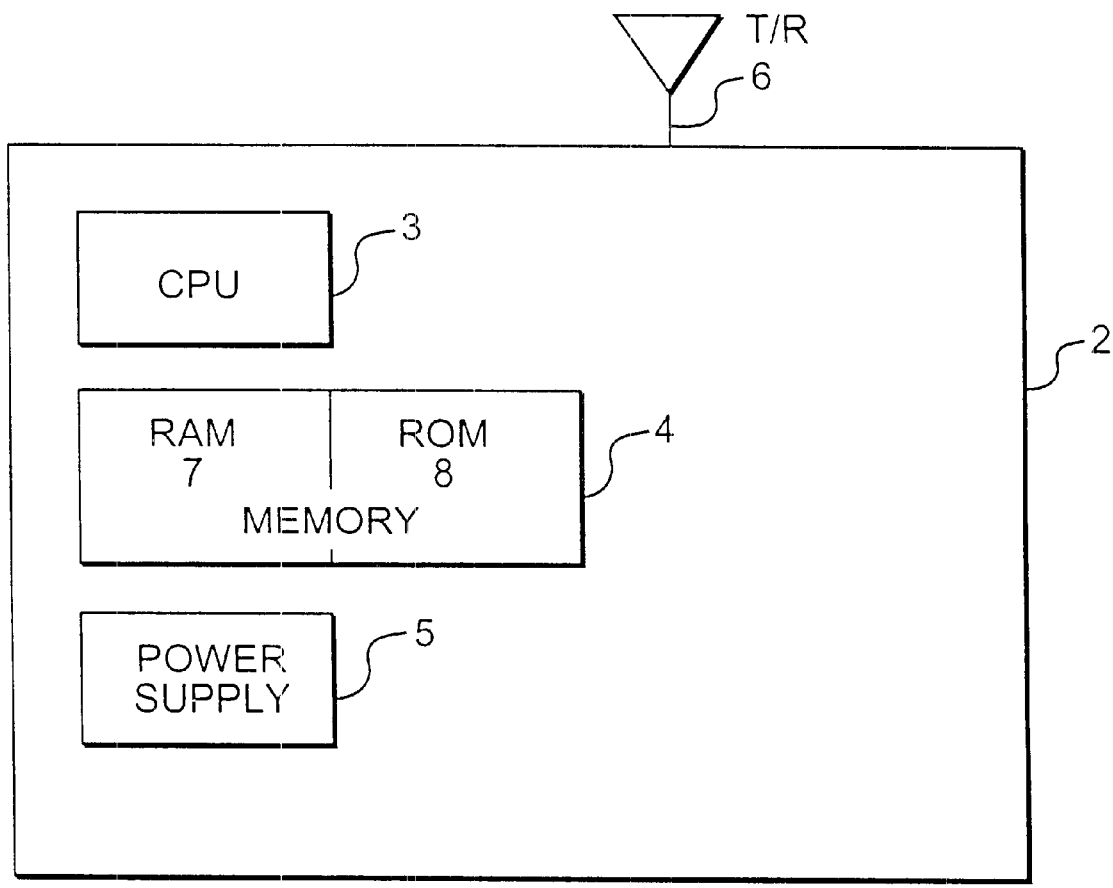
FIG. 1 is a block diagram of a mobile communications station.

A wireless mobile communications station 2 is shown in FIG. 1. The mobile station 2 includes at least one central processing unit (CPU or processor) 3, a memory 4 (suitable for storing computer executable software therein and/or for maintaining a data structure), a power supply 5, a transceiver 6 (e.g., a transmitter and a receiver), RAM 7 and ROM 8. As will be appreciated by those skilled in the art, the processor 3 executes computer executable software code in a known manner. As such, the processor 3 controls the operation of mobile station 2. The mobile station 2 may include more than one transmitter and/or more than one receiver. The mobile station 2 can also include an Ethernet interface, as well as other interfacing ports. With these arrangements, the mobile station 2 is able to communicate with mobile stations in the network.

In one embodiment, the mobile station 2 conducts concurrent or simultaneous communication with multiple mobile stations. Communication with multiple stations can occur, for example, through different channels and subchannels (e.g., different frequencies), and/or by transmitting specific identifying information (or "coded information") for each intended source or target. One definition of a channel is a means to communicate so at least two transmissions can proceed simultaneously without interfering with each other.

A "local" channel can be used for communication between a cluster head and affiliated cluster members, for example. Communication between a cluster head and an affiliated cluster member preferably occurs at a network-known, low-power level. Cluster heads can also use the local channel when issuing periodic cluster "beacons." Cluster heads preferably issue cluster beacons at a network-known, high-power level. In this preferred arrangement, each mobile station in the network recognizes that cluster beacons are transmitted at the high-power level.

Figure 6:
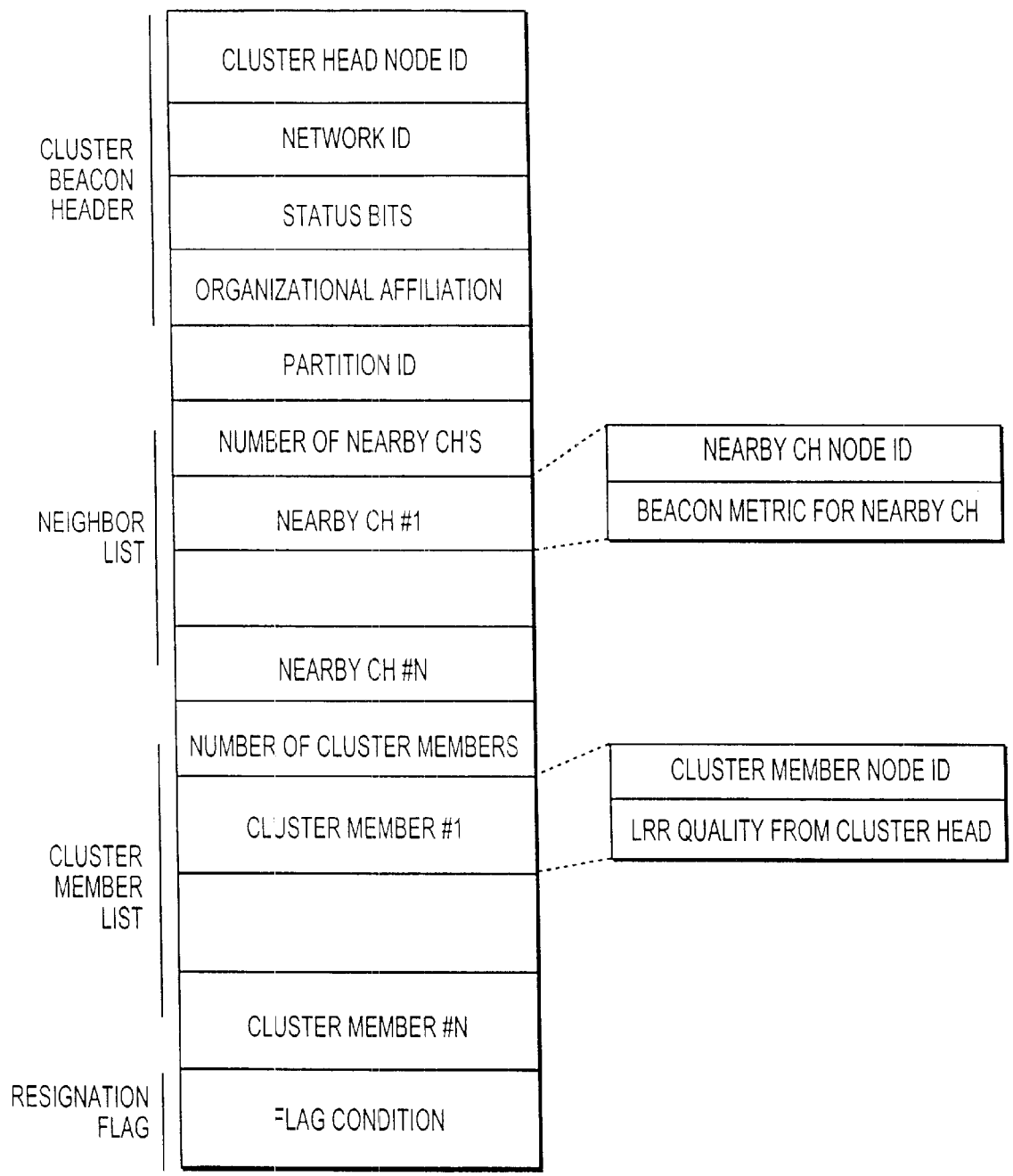
FIG. 6 illustrates a format of a cluster beacon according to the present invention.

A format of a cluster beacon is shown in FIG. 6. Cluster beacons preferably include a cluster beacon header, a neighbor list, a cluster member list, and a resignation flag field. A cluster beacon header may include a unique cluster head node ID, a network ID, a status field, organizational affiliation, a partition ID, and/or the like. A neighbor list can include information regarding potential neighbor cluster heads, and/or information pertaining to affiliated cluster heads. The neighbor list preferably includes an ID and a metric for each identified cluster head.

A metric is an expression or measure of how "expensive" it is to transmit across one link. Typically, a metric is calculated at the transmitting side of the link. For example, if a link exists between nodes A and B, the metric for a link from A to B is the sum of the cost of being processed at node A and the cost of being transmitted from node A to node B. Other factors for determining a metric for a link may include queuing delays at a node, congestion through a node, and statistical delay probabilities caused by interference or disruption of a signal, and so forth.

Returning to FIG. 6, the cluster member list identifies those cluster members that are affiliated with the issuing cluster head. For each identified cluster member, the neighbor list preferably includes an ID and a metric associated with that station. The resignation flag will be explained in further detail below.

Each mobile station in a network preferably forms a cluster beacon database (or other data structure) to help track cluster heads within transmission range. The beacon database can include fields such as cluster head ID, organization matches, beacon strength (or a metric qualifying the received beacon), a metric synthesizing all other beacon fields into a measure of how "good" a cluster would be to join, etc. A mobile station preferably uses information stored in the cluster beacon database to determine which cluster head (or heads) to affiliate with.

Preferably, each mobile station can select an optimum route (e.g., a route with the "lowest cost") to transmit messages throughout the network. To route messages in this manner, each node preferably maintains information regarding network topology. Network topology can be defined in terms of information gathered from a series of "snapshots" and/or message signals (including cluster beacons) which are issued from mobile stations in the network. These snapshots are routed or flooded through the network by the cluster heads in a known manner. Preferably, there are two types of snapshots: link-state and affiliation. A cluster head issues link-state snapshots, while a cluster member issues affiliation snapshots. Each snapshot preferably contains information such as current affiliated stations, potential neighbor stations, ID information, network metric information, etc. Mobile stations preferably store snapshot information in a database or data structure. Snapshots can be issued in accordance with a network change or on a predetermined interval, for example.

Mobile station 2 can gather and/or calculate other network information such as neighboring cluster heads, neighboring or affiliated cluster members, communications signal strength, metric information, number and type of affiliated stations, planned station movement over time, plans for entering radio silence, disruptions of communications caused by jammers, self-interference, or natural terrain, battery power remaining, and so forth. As will be appreciated by those skilled in the art, this information can be maintained in a database or other data structure.

To facilitate routing selection, in one embodiment, a forwarding table is created to express the cost of forwarding messages. Since each mobile station has a snapshot database, a shortest path tree with itself as the root and all other nodes (via affiliated cluster heads) as branches is created. The "length" of each link is given by the metric for that link, and a path metric is the sum of the lengths along that path. Once the tree is constructed, it is possible to generate a forwarding table that optimally indicates which "next-hop" node or which overall path having the lowest cost should be used for any giving destination node. As will be appreciated by those skilled in the art, this calculation can be performed via a shortest-path first algorithm, for example, Dijkstra's algorithm as explained in Chapter 5 of "Routing in Communications Networks," M. Steenstrup, ed., 1995. In this manner, each mobile station can determine a transmission path through any of its affiliated cluster heads to optimally send messages through the network. As will be appreciated by those skilled in the art, communication nodes can use many other known methods to determine transmission paths, and the above-described method is only provided as an example. Accordingly, the present invention is not limited by this example.

Preferably, a mobile station 2 automatically seeks out other mobile stations to form a network, or to join a pre-existing network. The mobile station 2 preferably operates in at least two modes. In the first mode of operation, the mobile station 2 serves as a cluster head (e.g., a network "access point" or "gateway") for other mobile stations. In this capacity, the cluster head is an intermediary between affiliated mobile stations and the network. In the second mode of operation, the mobile station 2 serves as a non-cluster head (e.g., a member of a cluster group). A mobile station preferably gains membership to a cluster group after successfully completing a "handshaking" protocol with the group's cluster head. As discussed, the mobile station can alter its transmission power level for operation in the first or second mode.

Figure 8:
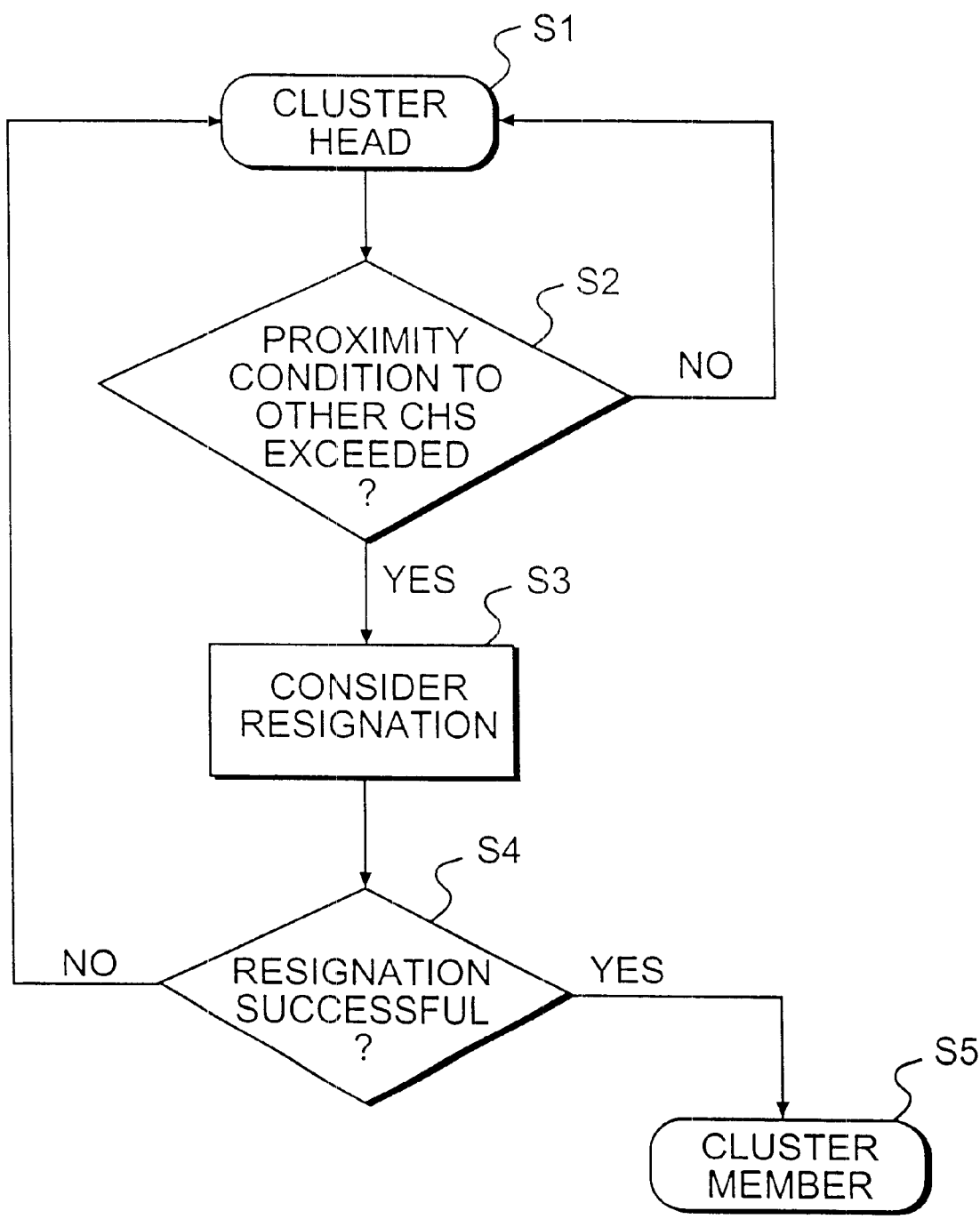
FIG. 8 is a flow diagram illustrating an operational aspect of a mobile communications station when operating in a cluster head mode.

A preferred resignation procedure will now be described with respect to the drawings. Referring to FIG. 8, mobile station 2 operates as a cluster head (S1). Preferably, mobile station 2 periodically checks its proximity to other cluster head stations (S2). Mobile station 2 checks its proximity by evaluating the signal strength of received cluster beacons in a known manner or by analyzing stored network topology information, for example. If the proximity condition is not exceeded, the mobile station preferably continues its operation as a cluster head station (S1). If the proximity condition is exceeded, however, the mobile station 2 preferably considers resigning as a cluster head (S3). A preferred resignation procedure is further explained below with reference to FIG. 5. Mobile station 2 determines whether the resignation is successful in step S4. Mobile station 2 commences operation as a cluster member if the resignation is successful (S5), or continues operation as a cluster head if the resignation is not successful (S1).

A preferred procedure for considering and executing a resignation procedure (e.g., steps S3 and S4 of FIG. 8) is now explained with reference to the flow diagram shown in FIG. 5. For illustrative purposes only, the following description is given from the viewpoint of mobile station 2 when operating as cluster head CH5, as shown in the relevant figures. Also, the following description is given with respect to decisions regarding a 1-connectivity point network arrangement (e.g., an articulation point). However, as will be readily understood by one of ordinary skill in the art, the concepts of the present invention also apply to other n-connectivity point arrangements and corresponding decisions.

Figure 5:
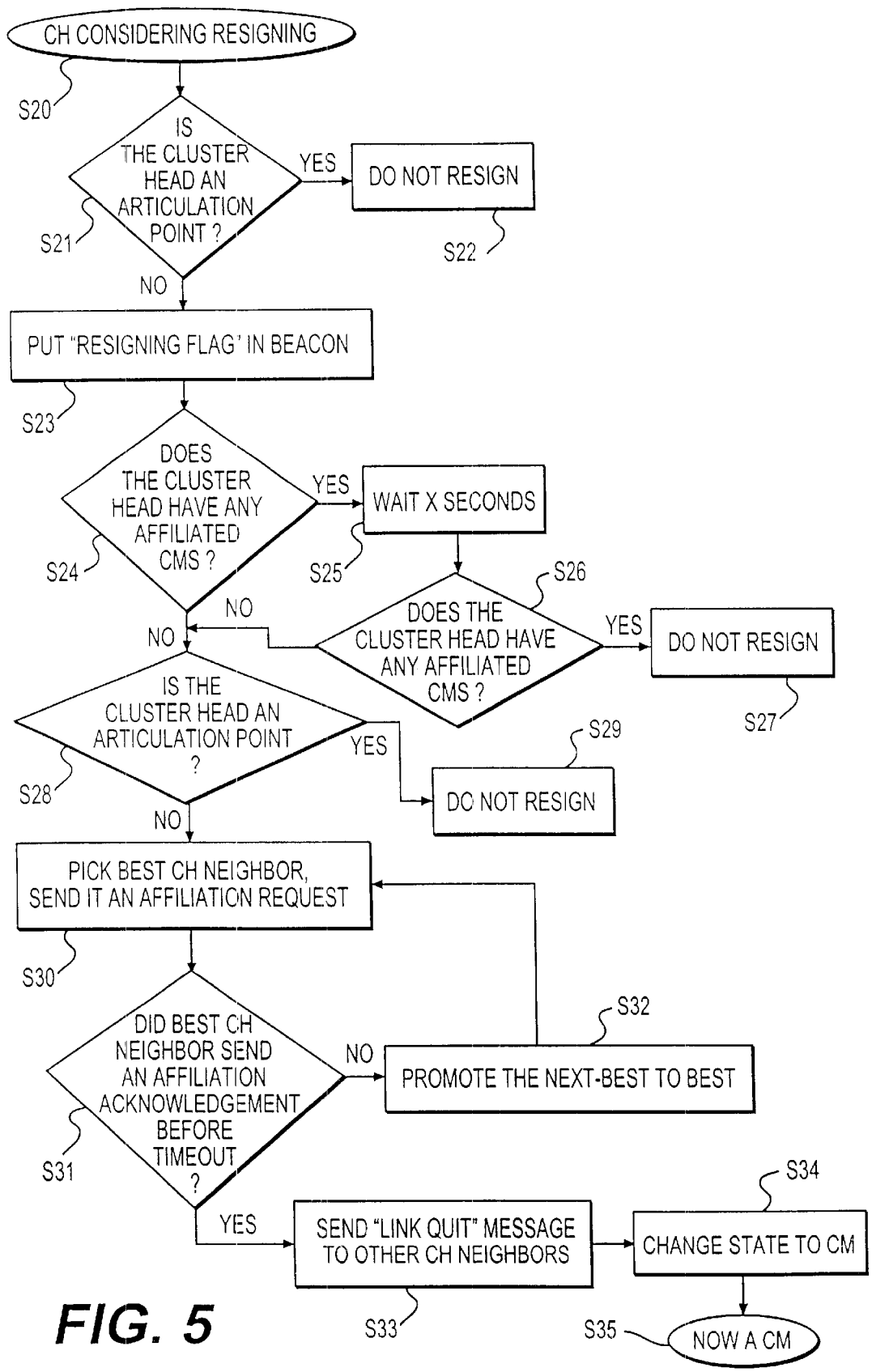
FIG. 5 is a flow diagram of a resignation procedure according to the present invention.

As shown in FIG. 5, cluster head CH5 considers resignation (S20), and determines whether it is an articulation point (S21). Preferably, cluster head CH5 makes such an articulation point determination by analyzing available network topology or by querying (e.g., signaling and waiting for a confirmation signal) linked cluster head stations. As discussed, mobile station 2 preferably maintains a database or data structure containing network topology information. Mobile station 2 can analyze the network topology information (e.g., network affiliation links) to determine whether it is an articulation point. Alternatively, mobile station 2 may send a message to one or more other network devices asking them to verify whether mobile station 2 is an articulation point. Such devices may include topology servers, management stations that can be manned or unattended, and so forth. The response from such a device (or devices) will indicate whether CH5 is an articulation (or other n-connectivity) point. Cluster head CH5 preferably will not resign if it is an articulation point (S22). Step S22 corresponds to the "NO" branch of the "Resignation Successful?" step S4 in FIG. 8. An example of cluster head CH5 serving as a network articulation point is shown in FIG. 2b.

Figure 7:
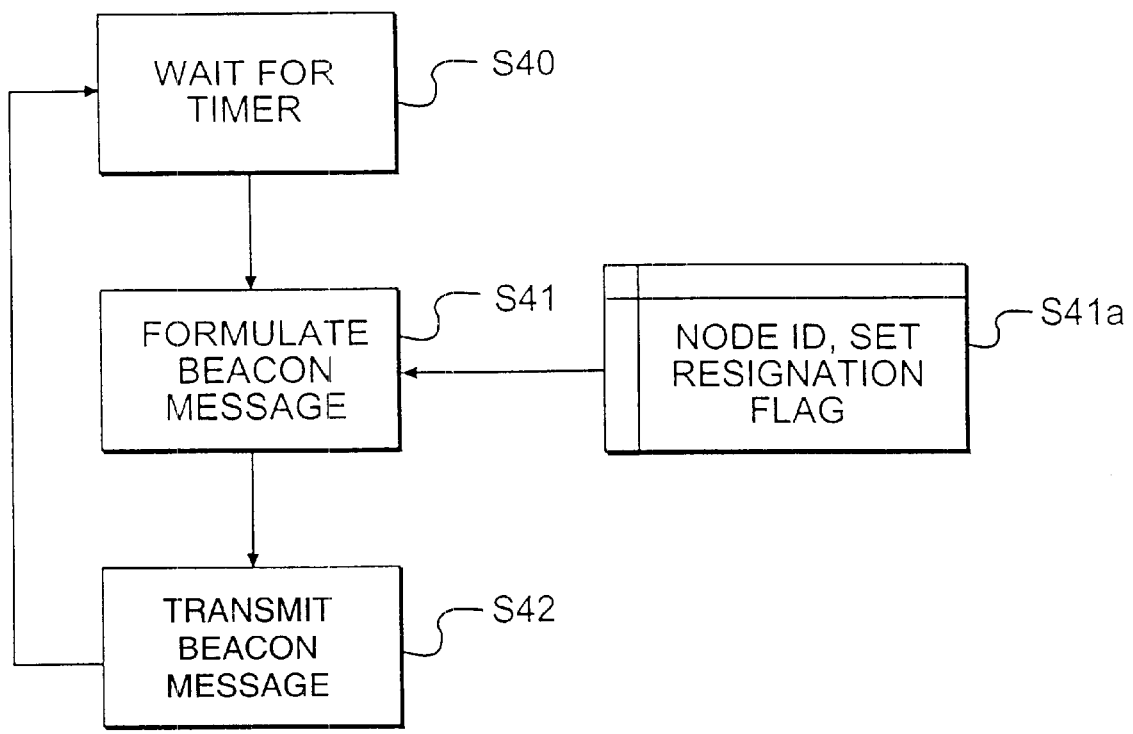
FIG. 7 is a flow diagram illustrating a procedure that updates and transmits a cluster beacon.

If cluster head CH5 is not an articulation point, a "resigning flag" is preferably set in its cluster beacon (S23). As shown in FIG. 6, a resignation flag condition can be set, and when transmitted, represents to other stations that cluster head CH5 is considering resignation. FIG. 7 shows a procedure for setting a resignation flag and transmitting a cluster beacon. Preferably, cluster head CH5 waits for a timer (S40) and then formulates a cluster beacon message (S41). The cluster beacon is formulated by updating a beacon to include at least a resignation flag condition that has been placed in a data structure (S41a). The cluster beacon is transmitted in step S42. In this regard, step S23 of FIG. 5 preferably updates the data structure, which is utilized in step S41a of FIG. 7. Alternatively, step S23 could activate steps S41, S41a and S42 without waiting for a timer.

Returning to FIG. 5, cluster head CH5 determines whether it has any affiliated cluster member stations (e.g., "CMS") in step S24. Preferably, cluster head CH5 makes this determination by analyzing network topology information maintained in a database (or other data structure) in the mobile station 2. As discussed, the network topology information can include neighboring cluster heads, neighboring or affiliated cluster members, communications signal strength, and so forth. Alternatively, mobile station 2 can maintain a list or a data structure that represents cluster members that are currently affiliated with mobile station 2.

Figure 2A:
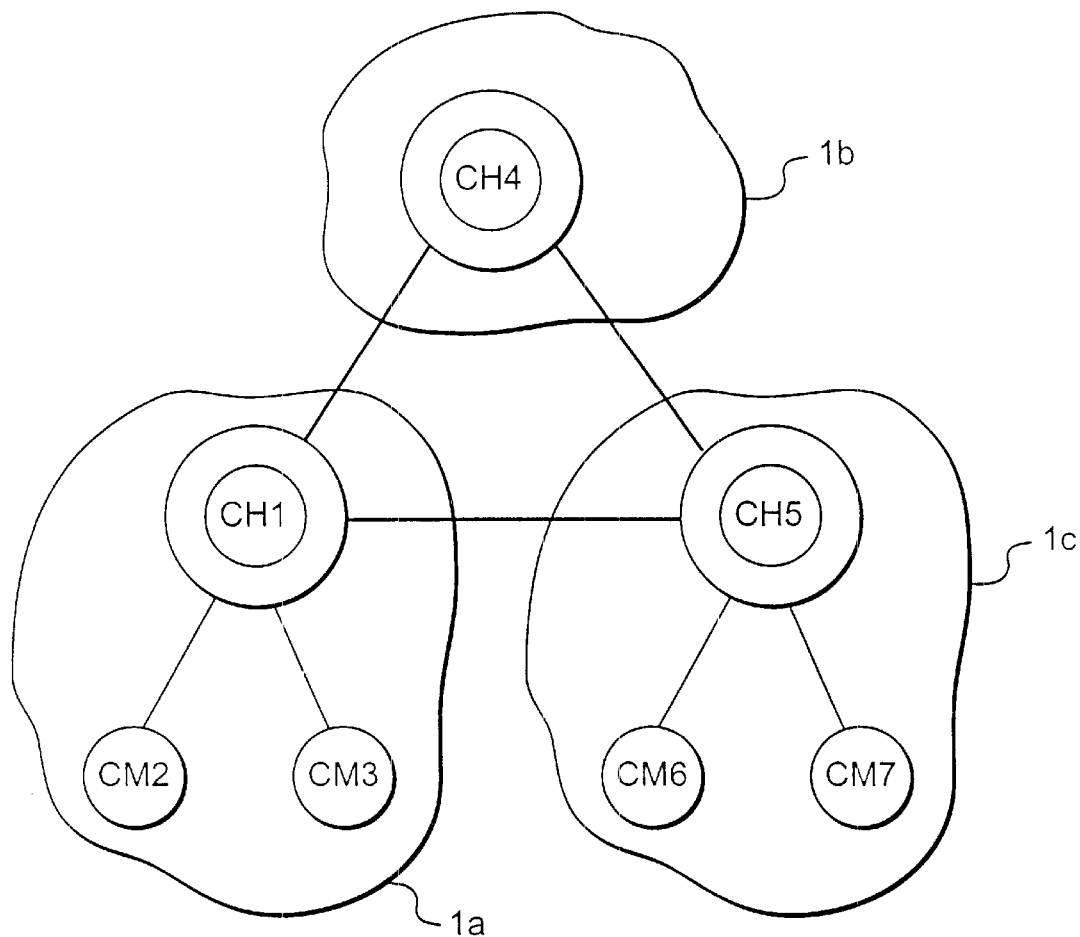
FIG. 2a is a diagram illustrating a network configuration.
Figure 2B:
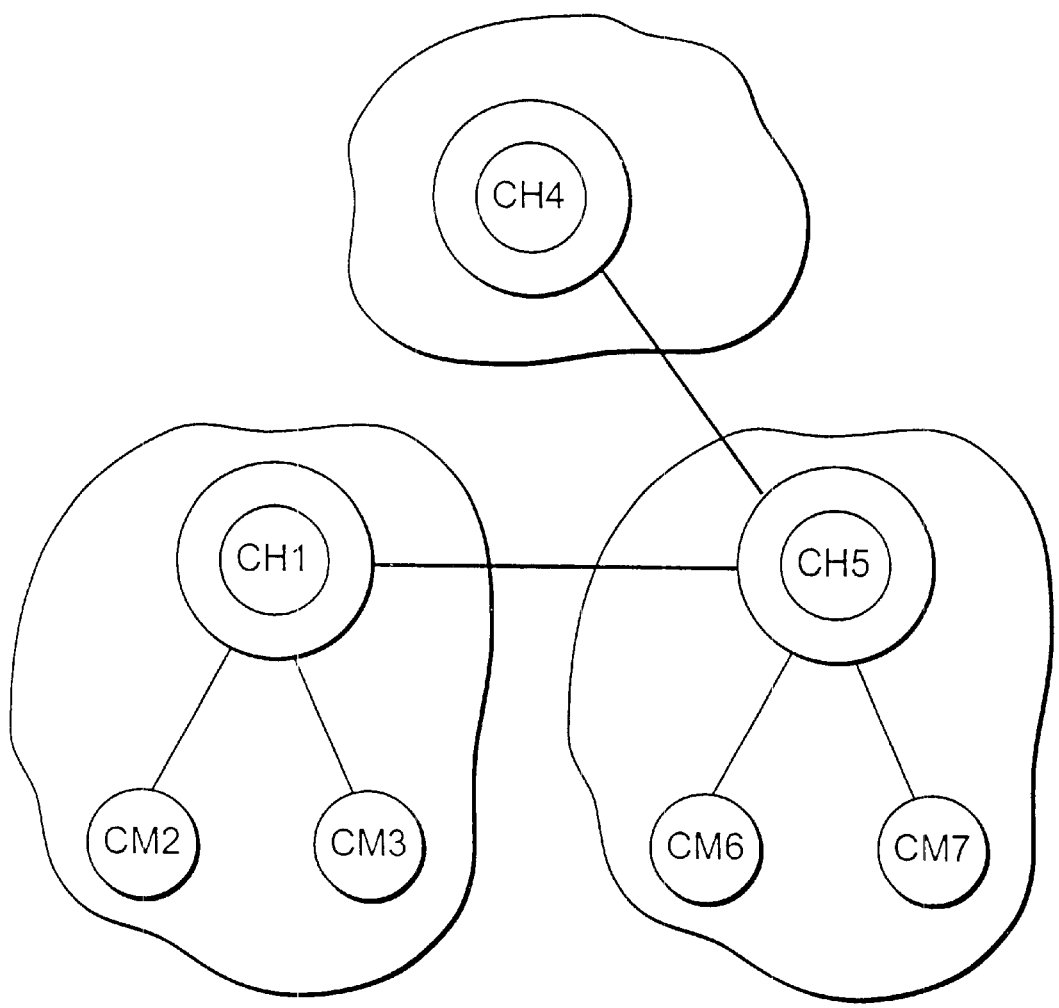
FIG. 2b is a diagram illustrating a 1-connectivity point, e.g., CH5 is an articulation point and its removal would partition the network such that CH1 and CH4 could no longer communicate with each other.

If cluster head CH5 has affiliated cluster members, as shown in FIG. 2a, flow continues to step S25. In step S25, CH5 waits for a predetermined time (e.g., "X" seconds) to allow for transmission and receipt of the resignation cluster beacon and for affiliated cluster members (e.g., CM6 and CM7) to reaffiliate with an available cluster head, if possible. At this point, CH5 again determines whether there are any remaining affiliated cluster member stations (S26). A cluster member will preferably remain affiliated with a cluster head if the cluster member is too far away from other cluster head stations, or if nearby cluster head stations are already overburdened with their current affiliated cluster members, for example. Alternatively, a cluster member will remain affiliated with a cluster head if the cluster head station has a preferred organizational affiliation, for example. Cluster head CH5 preferably will not resign from operating as a cluster head station if it still retains affiliated cluster members at this point (S27). Step S27 also corresponds to the "NO" branch of the "Resignation Successful?" step (S4) in FIG. 8.

Figure 3:
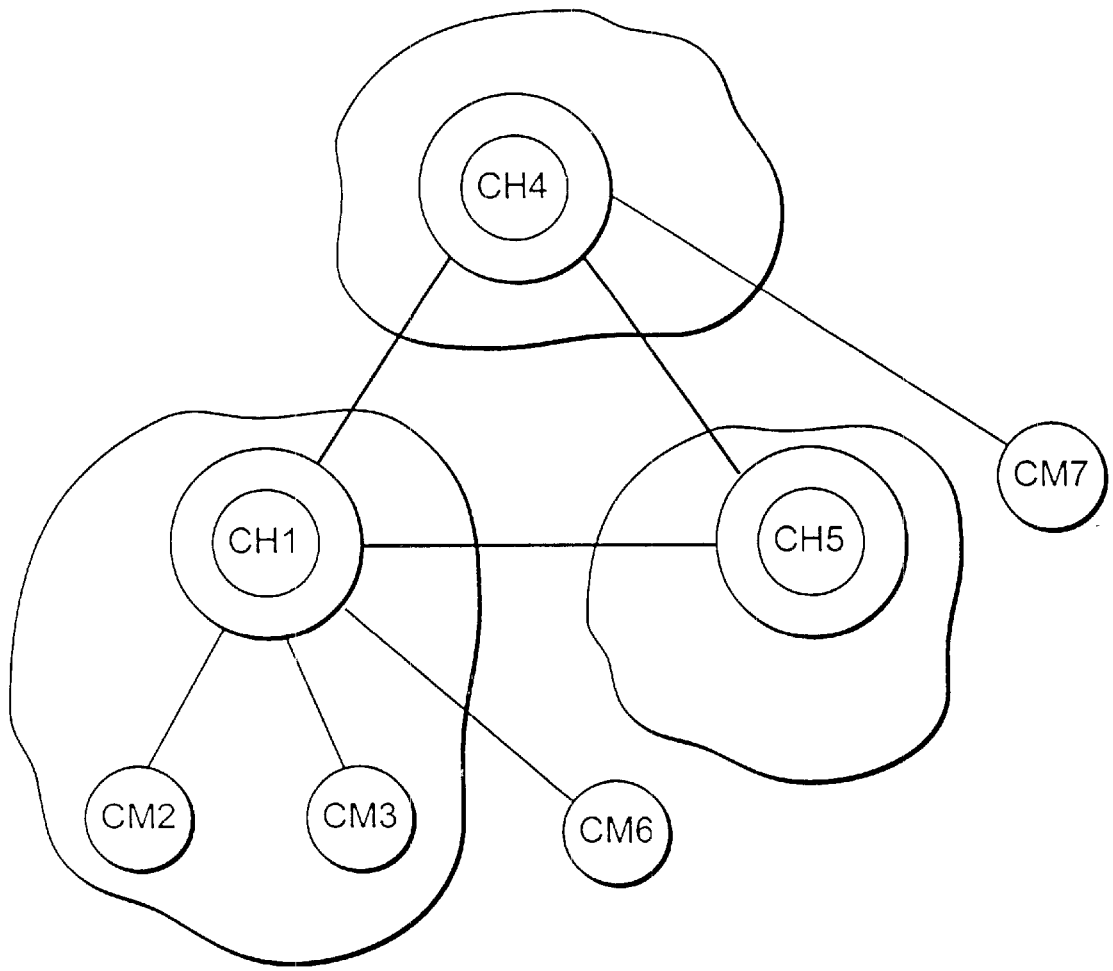
FIG. 3 is a diagram illustrating a network configuration during a cluster member reaffiliating stage of a resignation procedure according to the present invention, where CH5 is in the act of resigning and its current members (CM6 and CM7) are reaffiliating with other cluster heads.

One example of how the network of FIG. 2a may look when cluster members CM6 and CM7 reaffiliate is shown in FIG. 3. As shown, CM6 affiliates with the cluster headed by CH1 and CM7 affiliates with the cluster headed by CH4. As discussed, CH5 issues a cluster beacon to advertise that it is considering resigning as a cluster head. The cluster beacon (with a resignation flag set) places potential new cluster members on notice that CH5 is attempting to resign. Preferably, this notice discourages potential cluster members from trying to affiliate with CH5. However, even if a mobile station tried to affiliate with CH5 while CH5 considers resigning, CH5 does not acknowledge such a request or otherwise does not complete a "handshaking" protocol with the potential cluster member.

Cluster head CH5 preferably rechecks whether it is an articulation point (S28) when it does not have any affiliated cluster members. Cluster head CH5 rechecks whether it is an articulation point because the configuration of the network may have changed since cluster head CH5 last made such a determination. Cluster head CH5 preferably does not resign if it has become an articulation point (S29). Step S29 also corresponds to the "NO" branch of the "Resignation Successful?" step S4 in FIG. 8.

Figure 4:
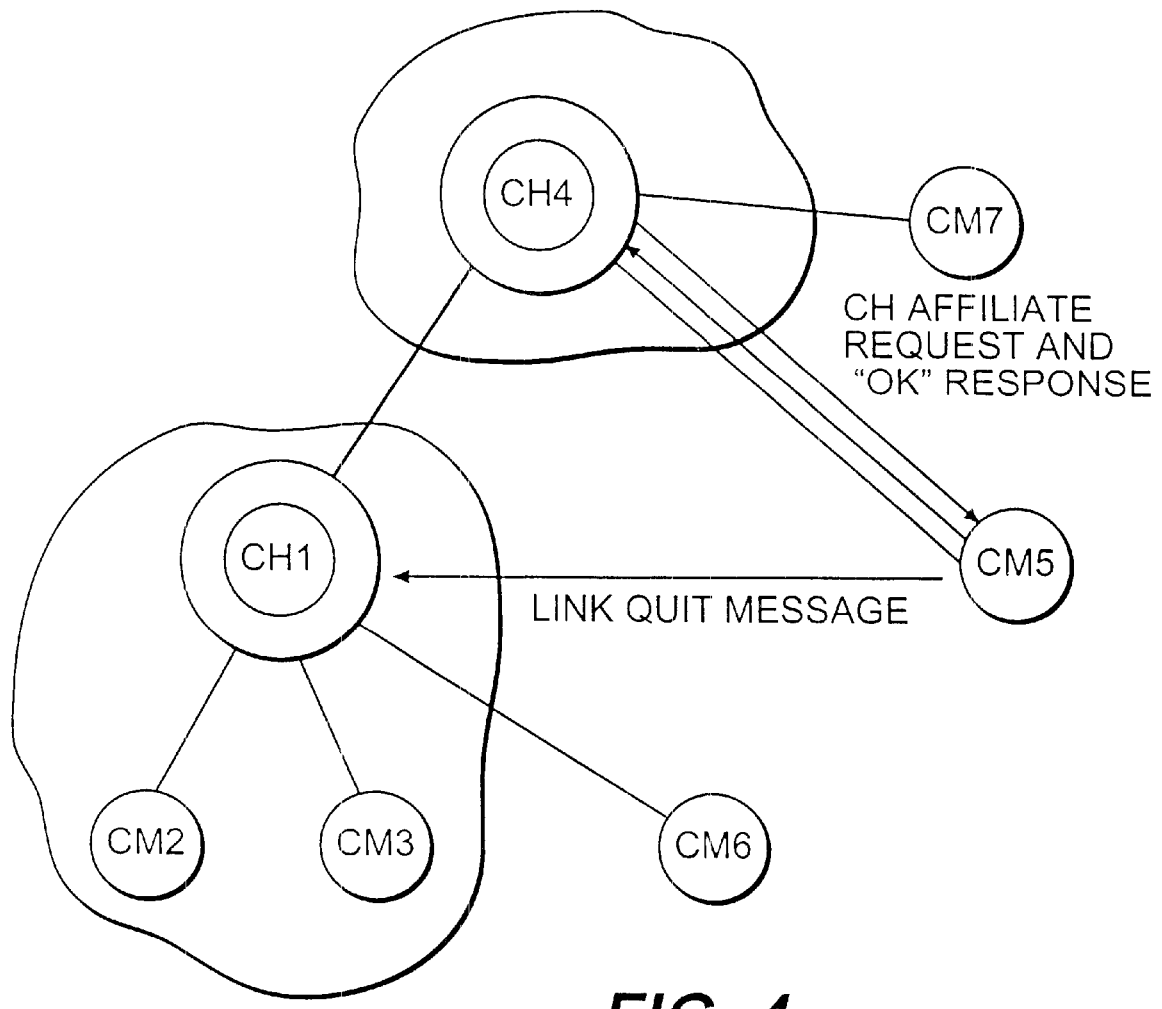
FIG. 4 is a diagram illustrating a network configuration during a cluster head reaffiliation stage of a resignation procedure according to the present invention, with all cluster members having left CH5 to affiliate with other cluster heads, and CH5 being in the process of becoming a cluster member (namely CM5).

If cluster head CH5 is not an articulation point, it determines its "best" affiliated cluster head neighbor and transmits to the "best" affiliated cluster head neighbor a cluster member affiliation request signal (S30). "Best" can be defined in terms of strongest signal strength, preferred organization affiliation, fewest affiliated cluster members, node metric, least node congestion, highest number of other backbone links, highest percentage of transmissions received without disruption, fastest communication link speed, least power required for transmissions, a station that is most compatible with planned movement of the cluster head station (e.g., the nodes will stay near by each other), plans for radio silence in the future, a best direction for pointing a directional antenna so as to avoid jammers or natural interference, and/or a quality link factor representing a summation of some or each of these types of factors, for example. As will be appreciated by those skilled in the art, these factors can be harvested from available network information, or can be calculated from stored or available information. As shown in FIG. 4, CH5 may determine that its "best" affiliated cluster head is CH4.

From a viewpoint of a receiving cluster head (e.g., CH4), once cluster head CH4 receives an affiliation request signal, it determines whether it will accept CH5 as a cluster member. For example, CH4 may evaluate CH5's signal strength, the number of mobile station currently affiliated with CH4, organizational characteristics, etc. If CH4 accepts the request, it preferably generates and transmits an acceptance signal to CH5. Otherwise, CH4 preferably will not transmit a signal in response. Cluster head CH5 preferably determines whether the "best" cluster head acknowledges its request to affiliate as a cluster member within a predetermined time (S31). The predetermined time is preferably set by an initial configuration of the mobile station 2. Alternatively, the predetermined time can be computed while the network is operational, e.g., by a function that scales the redetermined time by the local network activity so that the predetermined time allowed is longer when the nearby stations are busy with other transmissions and receptions.

If the "best" cluster head fails to acknowledge the request within the predetermined time, mobile station 2 promotes the next-best affiliated cluster head (S32) and transmits a request to affiliate as a cluster member signal to that cluster head (S30). In the FIG. 3 example, CH5 may decide CH1 is the next-best affiliated cluster head. As discussed, cluster head CH5 preferably maintains information in the database (or data structure) that can be organized to rank affiliated cluster heads.

Figure 9:
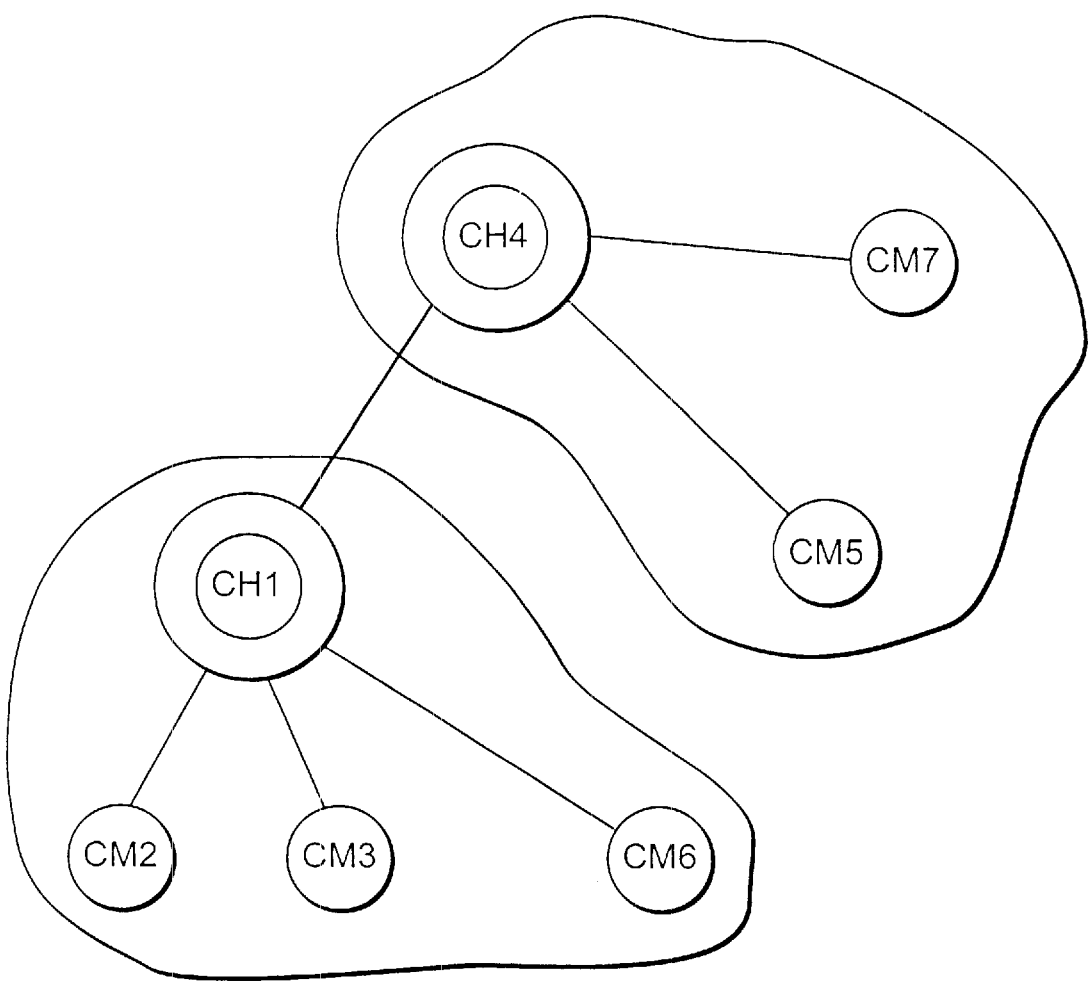
FIG. 9 is a diagram illustrating a network configuration after a successful resignation procedure.

Cluster head CH5 transmits a "Link Quit" message to its other former cluster head neighbors when a "best" cluster head (e.g., CH4) accepts cluster head CH5's request to affiliate as a cluster member (S33). The Link Quit message announces the resignation of CH5 as a cluster head. In a preferred embodiment, CH5 ceases operation as a cluster head and commences operating as a cluster member as soon as it transmits the Link Quit signal (S34). In this manner, cluster head CH5 maintains a communications link with the network (and minimizes resulting data loss) as it transitions from operating as a cluster head CH5 to operating as a cluster member CM5 (S35). Step S35 corresponds to step S5 of FIG. 8. An example of the new network configuration after a successful resignation of CH5 is shown in FIG. 9. As illustrated, cluster member CM5 (e.g., formerly "CH5") is affiliated with a cluster headed by CH4. Cluster member CM7 is also affiliated with CH4, and cluster member CM6 is affiliated with a cluster headed by cluster head CH1.

Accordingly, the above-mentioned problems are solved and the aforementioned objectives are reached. In particular, network routing overhead is reduced with the inventive resignation procedures. With the inventive resignation procedures, a resigning cluster head avoids severing communication as it reaffiliates with a former cluster head neighbor. In this regard, a resigning cluster head preferably avoids an initial "cluster member" affiliation protocol to establish a communications link with a cluster head, after it has ceased operation as a cluster head. Furthermore, the problem of data loss during resignation is reduced with the inventive procedures and apparatus, since a resigning cluster head maintains a communication link through which messages can be received or sent as it transitions to operate as a cluster member, for example.

The individual components shown in outline or designated by blocks in the drawings are all well known in the communication arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the preferred embodiments have been described with respect to a mobile station having two power levels. However, as will be appreciated by those skilled in the art, a mobile station that varies transmission power through many levels may be used. Hence, the concepts of the present invention would apply equally to a mobile station having many power levels.

As will be appreciated, cluster heads could be configured to transmit cluster beacons on the backbone and local channels, as well as other channels, to increase exposure to the network. Likewise, cluster members may transmit member beacons on the local channel, or may transmit member beacons over other such channels, if the mobile stations are so configured. Furthermore, the member beacons could be transmitted on the lower power level, or at an intermediate power level. Also, whereas FIG. 6 shows a possible beacon format, other formats may be used as long as the issuing nodes are identified, and a resignation notification, when needed, is conveyed. For example, the resignation flag could be included in the cluster beacon header.

Whereas FIGS. 2a, 2b, 3, 4 and 9 illustrate examples of possible network configurations, they should not be construed as limiting the present invention. Other possible configurations may include a different number of total stations, different n-connectivity arrangements, a different number of cluster heads, cluster members and/or affiliation connections, for example. Also, using CH5 and/or its arrangement as a 1-connectivity point with respect to the flowcharts of FIGS. 5 and 8 is in no way intended to limit the scope of the present invention.

Also, as will be appreciated by those skilled in the art, the methods, logic and procedures, as described herein, can be embodied in a programmable computer or in computer executable software. The software can be stored on a computer readable medium, for example, on a floppy disk, RAM, ROM, a hard disk, removable media, flash memory, memory sticks, optical mediums, magneto-optical mediums, CD-ROMs, etc.

Also, the flow diagram illustrated in FIG. 5 could include an additional step to handle a case where the list of "best" cluster head neighbors is exhausted before an acceptance signal is received. In this case, the process would return a "do not resign" signal, causing the cluster head to continue its operation as a cluster head station. Alternately, the process of requesting cluster membership from a number of "best" cluster heads could be performed in parallel instead of in series. That is, the resigning cluster head might send a number of messages to nearby cluster heads asking for cluster membership without awaiting a response from the first such cluster head. Then the resigning cluster head can pick the best of the respondents and affiliate with that cluster head.

Also, it maybe be desirable to ensure that a minimum number of nodes continuously operate as cluster gateway stations in a network. Accordingly, the procedures as generally illustrated in FIGS. 5 and/or 8 could include a step to initially determine whether a "Do Not Resign" flag is set. If the "Do Not Resign" flag is set, mobile station 2 will not resign and will instead continue its operation as a cluster head station, even if proximity or other resigning conditions are met. The "Do Not Resign" flag can be set by initial configuration, by user command, by commands from a network management station, etc.

Furthermore, there are other reasons why a mobile station might decide not to resign besides checking whether the mobile station is an n-connectivity point (e.g., steps S21 and S28 of FIG. 5). Other such resignation prohibiting factors include: a configured or command setting of a Do Not Resign flag that indicates that the station should never resign; pre-established plans for the station and nearby stations that indicate that the station will better serve the network if it does not resign; indications that other, nearby cluster heads are already in the process of resigning; discovery that some or all of its cluster members have not reaffiliated with other clusters; and so forth.

Also, the decision of step S2 in FIG. 8 could involve other resignation conditions besides just those of a proximity condition. For example, a mobile station could consider resigning if a predetermined time expires, based on analyzing network topology (e.g., the number of cluster heads in the network and location of cluster heads), based on planned movements of the station, based on battery power remaining, based on proximity to jammers, self-interference, or natural interference, etc.

Also, whereas FIG. 5 shows that the Link Quit message is transmitted prior to a resigning cluster head changing its status to operate as a cluster member, the Link Quit message could be transmitted after the cluster head changes its status. Furthermore, a resigning cluster head could transition from operating as a cluster head to operating as a cluster member as soon as the cluster head received an acceptance message. Also, a resigning cluster head could be configured to maintain communication links with former cluster head neighbors until the Link Quit message was acknowledged. Alternatively, in lieu of transmitting a Link Quit message, a resigning cluster head could forward a new affiliation snapshot to be flooded through the network by its new cluster head. Former cluster head neighbors would be notified of the resignation by receiving an updated snapshot in such a manner.

What is claimed:

1. A mobile communications station which communicates among a plurality of mobile stations in a network in which stations are arranged in clusters of communication member stations, with one member station in each cluster being a head station for the cluster, each member station communicating with the network through one or more cluster head stations, the cluster head stations communicating with other cluster head stations, the mobile station including a transceiver which transmits signals to and receives signals from mobile stations in the network, said mobile communications station comprising:

a memory having network information stored thereon;

a processor which (i) operates said mobile station as a cluster head station; (ii) resigns said mobile station form operating as a cluster head station; and (iii) maintains affiliation with a cluster head neighbor at least during a period in which said mobile station resigns from operating as a cluster head station and commences operating as a cluster member of the cluster head neighbor, wherein sad processor determines whether said mobile station is a network n-connectivity point, and prevents said mobile station from resigning as a cluster head station when said mobile station is an n-connectivity point, wherein said processor selects a first neighboring cluster head station to maintain affiliation with while resigning as a cluster head station, and wherein said processor controls the transceiver to transmit a signal to the selected first cluster head station requesting a status change from a cluster head station to a cluster member station.

2. A mobile communications station according to claim 1, wherein the processor resigns the mobile station from operating as a cluster head station when said mobile communication station receives an acknowledgement from the selected first cluster head station, while said processor maintains a communication link with the first cluster head station.

3. A mobile communications station according to claim 1, wherein said processor selects a second neighbor cluster head station to maintain affiliation with when said mobile station does not receive an acknowledgement from the first neighbor cluster head.

4. In a communication system for communication among plural member stations in a network in which member stations are arranged in clusters of communication member stations with one of the member stations being a cluster head, each member station communicating with the network through at least one affiliated cluster head stations, the cluster head stations communicating with other cluster head stations, a method of operating a communication station comprising the steps of;

operating the communications station as a cluster head station;

resigning the communication station form operating as a cluster head station;

maintaining affiliation with a first neighbor cluster head station while the communications station transitions from operating as a cluster head station to operating as a member station of a cluster headed by the first neighbor cluster head station; and transmitting a signal to the first neighbor cluster head to announce resignation and to request a status change from a cluster head neighbor to a cluster member station.

5. The method according to claim 4, further comprising the steps of:

resigning the communications station from operating as a cluster head station when the communications station receives an acceptance signal from the first neighbor cluster head station; and transmitting a signal to at least a second neighbor cluster head station signaling the resignation of said communications station as a cluster head station.

6. In a communications system for communication among plural stations in a network in which stations are arranged in clusters of communication member stations with one of the member stations being a head station of the cluster, the cluster head stations communicating with other cluster head stations, a method for configuring the network of stations includes the steps of:

operating at least a first and a second station of the plural stations as cluster head stations, the first and second stations forming a communications link;

resigning the first station from operating as a cluster head station when a predetermined resignation condition is met;

maintaining the communication link between the first and second station as the first station transitions from operating as a cluster head station to operating as a cluster member station of a cluster headed by the second cluster head station;

transmitting a signal representing an intention of the first station to resign as a cluster head station;

determining whether the first station is a network n-connectivity point;

preventing the first station from resigning as a cluster head station when the first station is a network n-connectivity point; and transmitting a signal from the first station to the second station to announce resignation and to request a status change from a cluster head neighbor to a cluster member station.

7. The method according to claim 6, further comprising the steps of:

resigning the first station from operating as a cluster head station when the first station receives an acceptance signal from the second station; and transmitting a signal to at least a third cluster head station of the plural station to signal the resignation of the first station as a cluster head station.

* * * * *

UNITED STATES PATENT AND TRADEMARK OFFICE
CERTIFICATE OF CORRECTION

PATENT NO. : 6,493,759 B1
DATED : December 10, 2002
INVENTOR(S) : William S. Passman et al.

It is certified that error appears in the above-identified patent and that said Letters Patent is hereby corrected as shown below:

<u>Title page,</u>
Add: -- [73] Assignee: BBNT SOLUTIONS LLC
　　　　　　　　Cambridge, Massachusetts --

Signed and Sealed this

Eighteenth Day of March, 2003

JAMES E. ROGAN
*Director of the United States Patent and Trademark Office*